Aug. 14, 1923.

J. A. REUTER

FRUIT CLEANER

Filed May 18, 1922

John A. Reuter Inventor

By Vernon E. Hodges his Attorney

Aug. 14, 1923.
J. A. REUTER
1,464,775
FRUIT CLEANER
Filed May 18, 1922
6 Sheets-Sheet 5
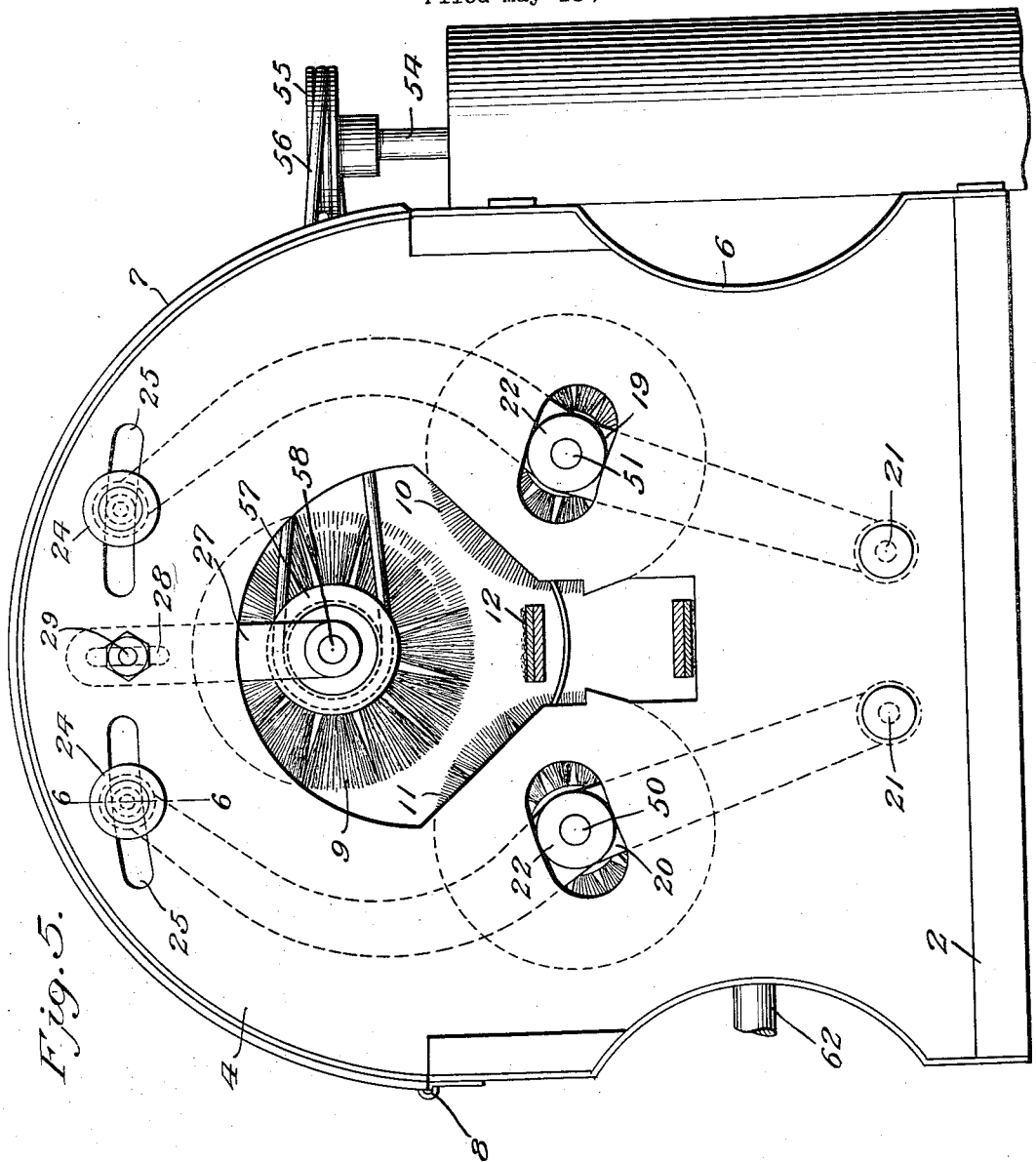
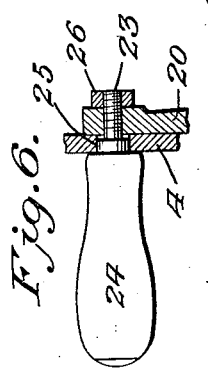
Inventor
John A. Reuter
By Vernon E. Hodges
his Attorney Aug. 14, 1923.
J. A. REUTER
FRUIT CLEANER
Filed May 18, 1922
1,464,775
6 Sheets-Sheet 6
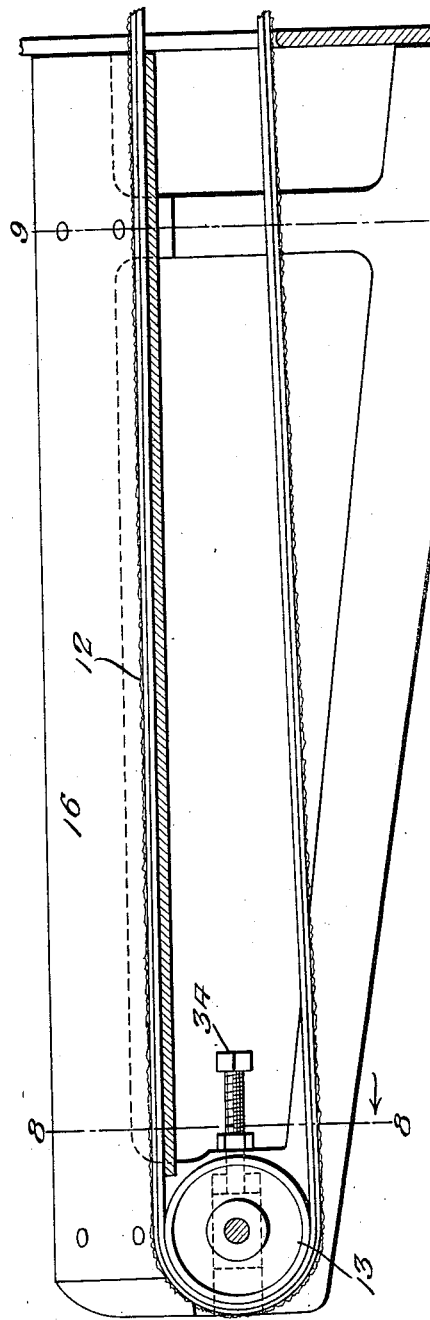
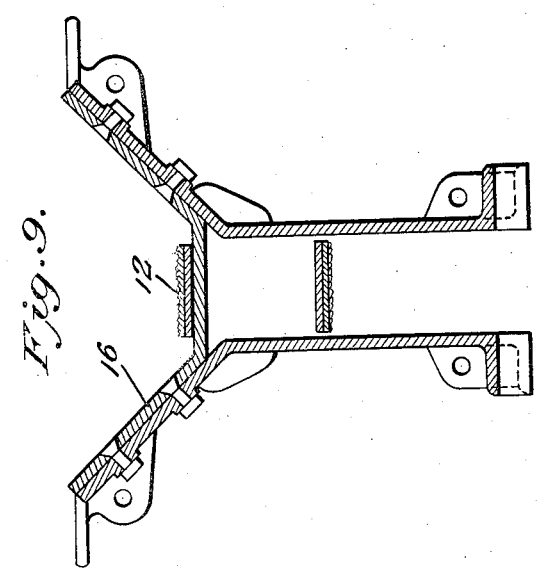
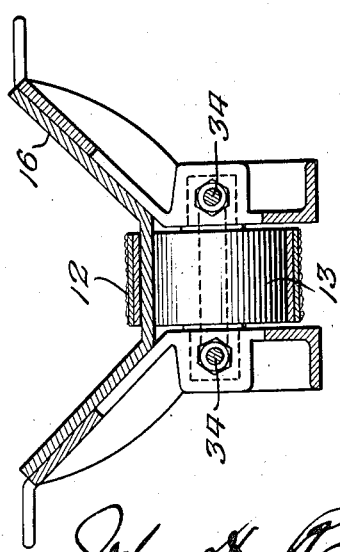
Inventor
John A. Reuter
By Norman E. Hodges
his Attorney Patented Aug. 14, 1923.

1,464,775

UNITED STATES PATENT OFFICE.

JOHN A. REUTER, OF THE DALLES, OREGON, ASSIGNOR TO THE NATIONAL FRUIT CLEANER COMPANY, OF THE DALLES, OREGON, A CORPORATION OF OREGON.

FRUIT CLEANER.

Application filed May 18, 1922. Serial No. 561,906.

*To all whom it may concern:*

Be it known that I, JOHN A. REUTER, a citizen of the United States, residing at The Dalles, in the county of Wasco and State of Oregon, have invented certain new and useful Improvements in Fruit Cleaners, of which the following is a specification.

My invention relates to an improvement in fruit cleaners.

My present invention provides means for effectually cleaning fruit that has received a late spraying after the fruit has formed, and the desideratum is to clean and polish the fruit without removing the coating provided by nature, which resembles paraffine, thus preserving the fruit in its native condition, and, while thoroughly cleaning it of all extraneous substances, not impairing the soundness or the lasting qualities of the fruit in any way.

In the accompanying drawings:

Fig. 5 is an end view of the feed end of the machine;

Fig. 6 is a fragmentary sectional view on the line 6—6 of Fig. 5;

Fig. 7 is a longitudinal sectional view showing the feed-belt;

Fig. 8 is an enlarged section on the line 8—8 of Fig. 7;

Fig. 9 is an enlarged section on the line 9—9 of Fig. 7.

The numeral 1 represents the legs of the machine supporting the body portion 2 upon some suitable base 3, and 4 and 5 are the heads at the feed and discharge ends respectively of the machine. 6, is a sheet-metal casing, and 7 is a cover held to the casing by hinges 8; and within the casing and cover the major portion of the effective working mechanism of the machine is located.

Figure 3:
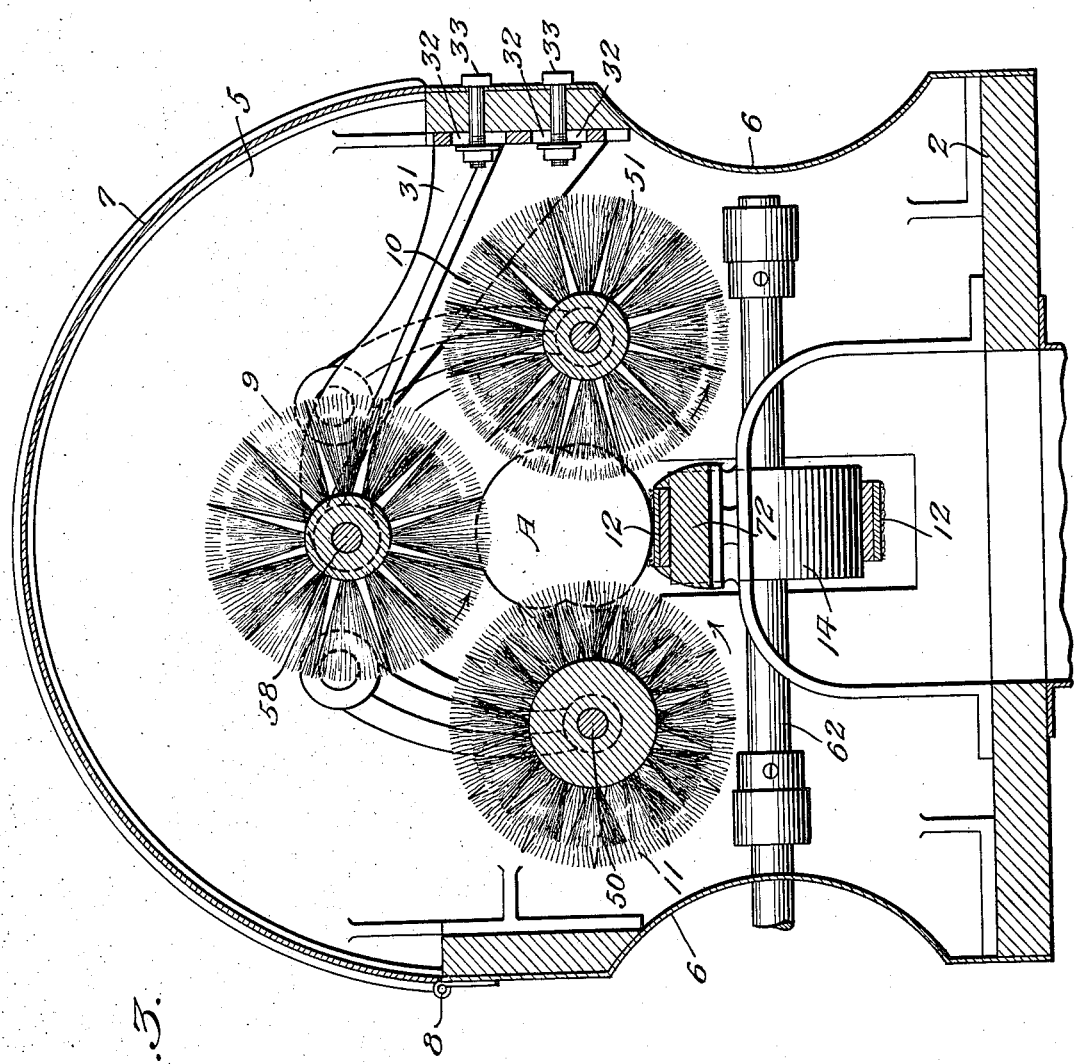
Fig. 3 is an enlarged transverse sectional view on the line 3—3 of Fig. 1, looking to the right, or in the direction of the arrow.
Figure 4:
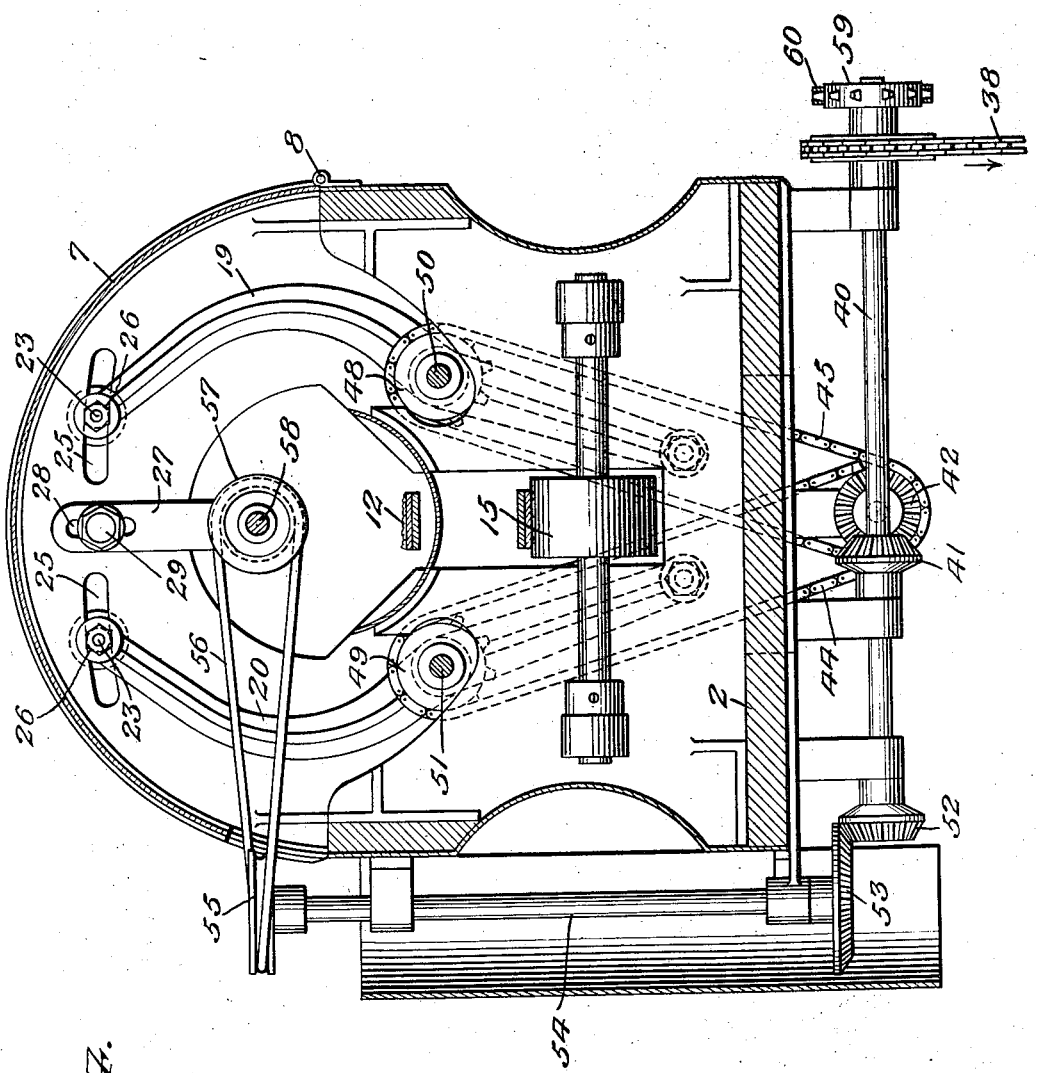
Fig. 4 is a similar section on a somewhat smaller scale on the line 4—4 of Fig. 1, and looking in the direction of the arrow.

There are three brushes extending longitudinally of the machine with their axes approximately parallel, and of these rotary brushes 9 and 10 are spiral, and rotate in opposite directions as indicated by the arrows in Fig. 3, whereas the brush 11 has bristles straight or non-spiral, and this brush may rotate in either direction, but, as a matter of fact, is illustrated as rotating in the same direction as brush 10.

The fruit is conducted into the machine, and through the space formed between the three rotating brushes by an endless belt 12, which is conveyed around the drum 13 at the feed end, drum 14 at the discharge end, and over a supporting intermediately located drum 15 at some point, say about midway between the ends of the machine.

A V-shaped trough 16 flanks the belt by a sloping wall, as clearly viewed in Figs. 8 and 9, and into this trough 16 the apples or other fruit A are discharged, the endless belt carrying the fruit forward into the machine and through the space 17 formed between the three rotating brushes 9, 10 and 11.

By means of the two spirally-arranged and one straight bristled brushes, the surface of the fruit is thoroughly brushed and cleaned, the two spiral brushes by turning together in opposite directions having the effect of rotating the fruit while brushing it, and the straight-bristled brush tending more or less to retard it while brushing it as the belt 12 conveys the fruit progressively through the machine from one end to the other.

Figure 1:
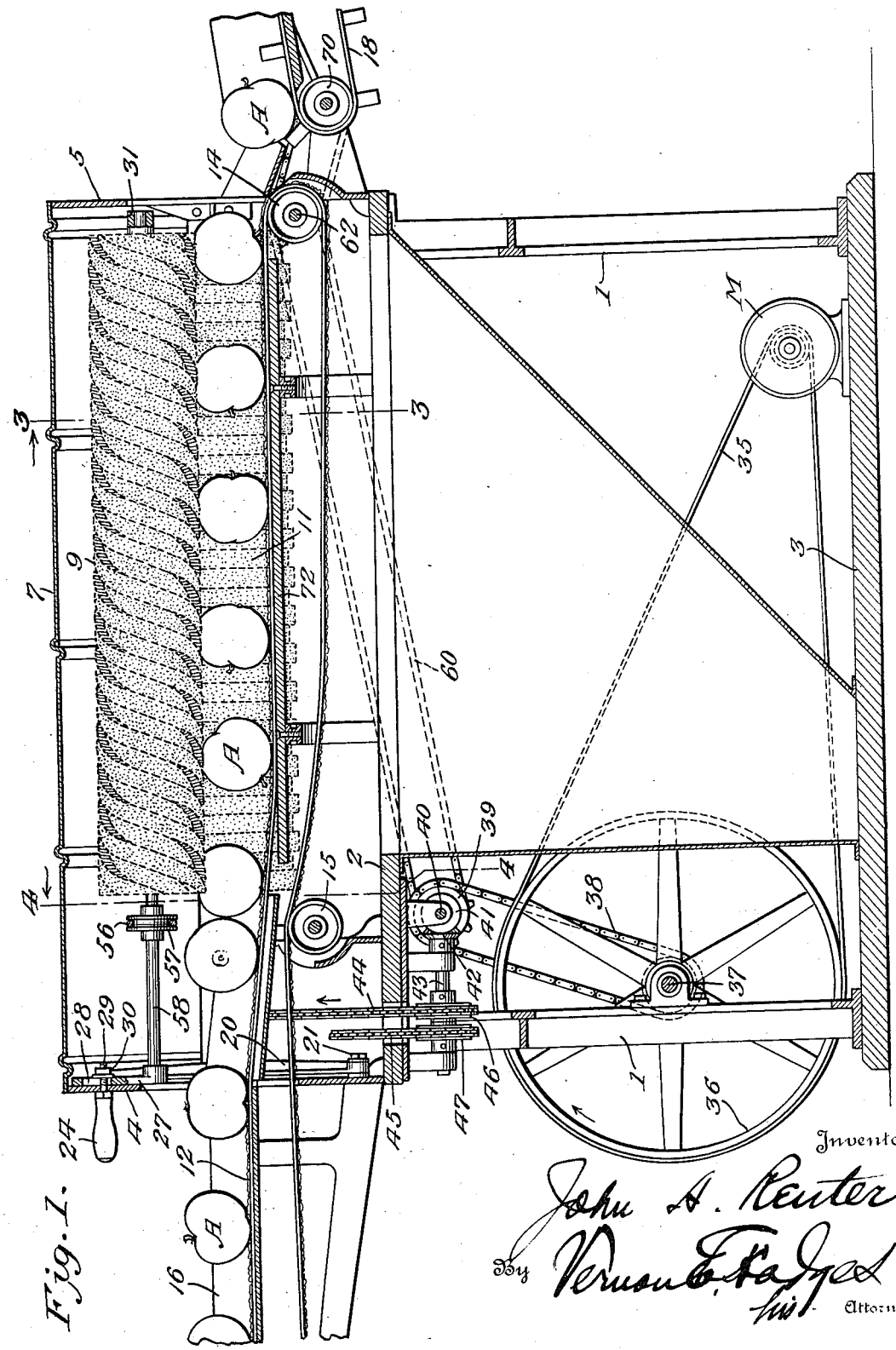
Fig. 1 is a vertical longitudinal section.
Figure 2:
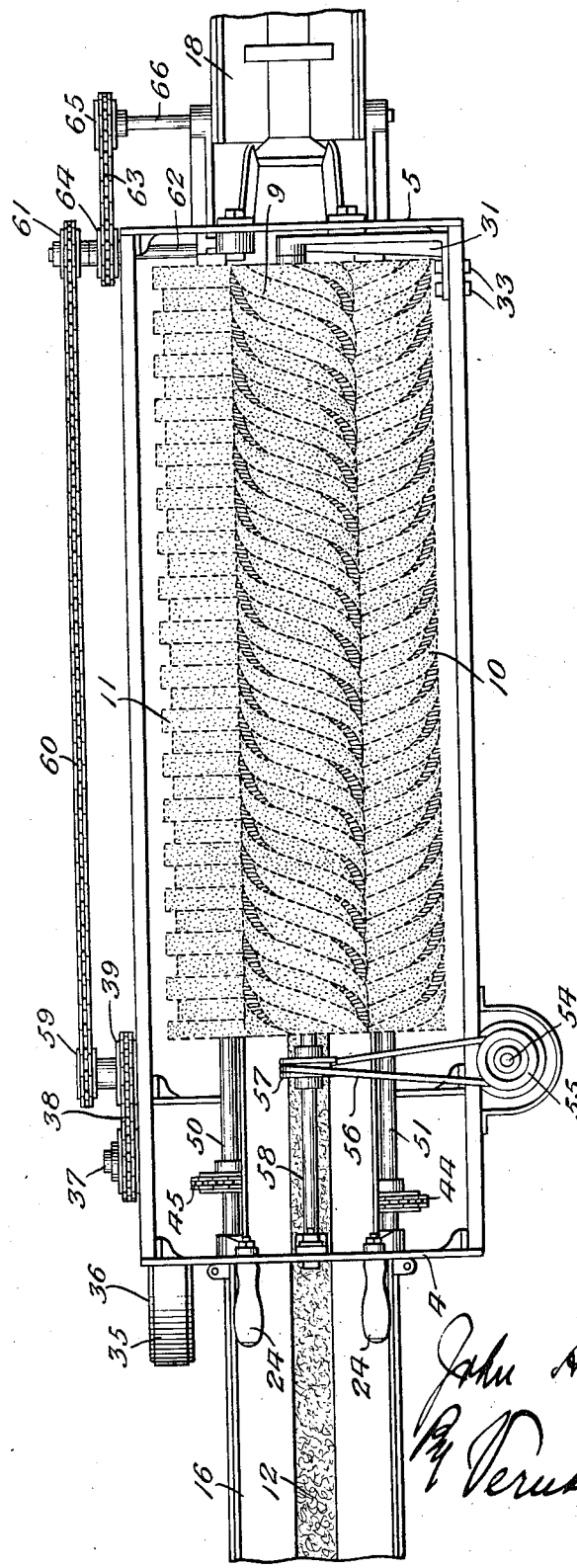
Fig. 2 is a top plan view.

When discharged from the machine, another belt 18 takes the fruit as shown in Fig. 1, and conducts it off to some convenient point.

Suitable provision is made for adjusting the brushes. A simple means for accomplishing this is a pair of arms 19 and 20 pivoted on the studs 21 at their lower ends, and forming supports for the journals 22 of the two brushes 10 and 11 at or near their centers. The upper ends of these arms 19 and 20 are fastened in their adjusted position by screw 23 on the handle 24 extending through the slot 25 arranged in the arc of a circle struck from the pivot 21 as a center, as shown in Fig. 5.

A nut 26 on the screw 23 is employed to loosen or tighten the parts before and after adjustment of the arms 19 and 20. The center brush 9 is adjusted through an arm 27, which has a slot 28, and a bolt 29 passing through the slot 28 has a nut 30 thereon, and by this arrangement the arm may be raised or lowered to raise or lower the forward end of the centrally located spiral brush. The journal at the rear end of this brush turns in a bracket 31, which has vertically-disposed slots 32 through which the bolts 33 extend, whereby to raise or lower the bracket to correspond with the adjustment at the forward end just described.

By this adjustment, the throat-like channel between the three rotary brushes 9, 10 and 11, and the endless belt conveyor 12 may be adjusted and varied according to the size of the apple or other fruit being cleaned.

Belt 12 may be tightened by a screw 34, as shown in Fig. 7.

Any means may be employed for driving the mechanism, such as an electric motor M, as shown in Fig. 1; and in like manner any suitable gearing may be adapted for transmitting motion to the various parts. For instance, as illustrated, a belt 35 extends from the motor to a drive-wheel 36 keyed on the main drive-shaft 37; and from this the sprocket chain 38 extends around a sprocket wheel 39 keyed on the shaft 40. This shaft 40 has a bevel-gear 41 which meshes with a bevel-gear 42 on the stub-shaft 43, and from this stub-shaft the two chains 44 and 45, extend around the sprocket-wheels 46 and 47 respectively on the stub-shaft to the sprocket-wheels 48 and 49 on the shafts 50 and 51, which carry the rotary brushes 10 and 11 respectively.

A bevel gear 52 keyed on one end of the shaft 40 meshes with, and transmits motion to, a bevel-gear 53 on the vertical shaft 54, and this has a groove pulley 55 on its upper end, and a belt 56 extends around a grooved pulley 57 keyed on the shaft 58, which carries the upper rotary spiral brush 9.

A sprocket-wheel 59 on the opposite end of shaft 40 transmits motion through a sprocket-chain 60 to a sprocket-wheel 61 on the shaft 62, which carries the drum 14 which drives the conveyor-belt 12. A chain 63 extends from a sprocket-wheel 64 on the shaft 62 to a sprocket-wheel 65 on the shaft 66 which carries the drum 70. The latter drives endless belt 18.

While the gearing obviously might be varied to suit the requirements, the foregoing is a simple arrangement for the purpose.

The belt 12 may be faced with some soft material, such as sheepswool, and it is supported from beneath and on either side by the track 72, as shown in Figs. 1, 3, 4 and 5. The apples are placed in the trough 16, where they are picked up by the belt 12 and conducted through the machine, and as they meet the rollers they are turned in all directions, they being brushed from three different sides simultaneously while being conducted through the machine on the belt by contact with a fourth side; but owing to the continuous travel of the belt, and consequent constant urging forward of the apple from that course, the apple is continuously turned while being brushed by the spiral arrangement of two of the brushes turning in contact therewith in opposite directions.

In this way, every particle of the surface of the apple, including the depressions at the stem and calix, are repeatedly brushed and cleaned by the three rotating brushes.

I claim:

1. A fruit cleaner including at least three rotary brushes enclosing a space therebetween, a conveyor located within the space and traveling therein lengthwise of the brushes, means for rotating the brushes, and means for actuating the conveyor whereby articles carried by the conveyor are moved forward in contact with the several brushes.

2. A fruit cleaner including a plurality of rotary brushes arranged in triangular relation around and enclosing a space, and an endless conveyor traveling lengthwise the brushes through said space for conducting the objects to be brushed, whereby to insure the repeated overturning and exposure of the said objects carried by the conveyor to the influence of the several brushes, some of the brushes plain and some spiral, and means for rotating said brushes in opposite directions.

3. In a fruit cleaner, the combination with a plurality of rotary brushes arranged about a center, whereby to form an open space, means for rotating said brushes in different directions, and means for conveying the articles to be treated by the brushes longitudinally through the space between the brushes and in the direction of the axes of the brushes.

4. In a fruit cleaner, the combination with a plurality of rotary brushes arranged about the center, whereby to form an open space, certain of said rotary brushes being plain, and certain of them spiral, means for rotating said brushes in different directions, and means for conveying the articles to be treated by the brushes longitudinally through the space between the brushes and in the direction of the axes of the brushes.

5. In a fruit cleaner, the combination with a slotted casing, a plurality of rotary brushes and a conveyor, of means for adjusting certain of said brushes consisting of arms pivoted at one end to the casing and forming bearings for the brushes, and handles each having a bolt at one end extending through the arms and the slots in the casing, with nuts on the bolts adapted to secure the arms in adjusted position.

6. A fruit cleaner including an endless conveyor belt faced with soft material, and three brushes arranged opposite and at either side of the conveyor, with a space left between the brushes and conveyor through which the articles to be brushed are conveyed lengthwise of the brushes, two of the brushes being rotated in the same direction, and one in the opposite direction from the other.

7. A fruit cleaner including an endless conveyor belt faced with soft material, and three brushes arranged opposite and at either side of the conveyor, with a space left between the brushes and conveyor through which the articles to be brushed are conveyed lengthwise of the brushes, two of the brushes being rotated in the same direction, and one in the opposite direction from the other, certain of said brushes on the plan of a spiral and at least one plain, whereby the article to be brushed is turned in various directions as it is carried by the conveyor in contact with the brushes.

8. A fruit cleaner including a conveyor and three rotary brushes extending approximately parallel therewith and in triangular relation, whereby a space is formed between the three brushes and the conveyor through which the articles to be brushed are conveyed by the conveyor and turned and brushed by the brushes, two of said brushes being spiral and one plain.

9. A fruit cleaner including a conveyor and three rotary brushes extending approximately parallel therewith and in triangular relation, whereby a space is formed between the three brushes and the conveyor through which the articles to be brushed are conveyed by the conveyor and turned and brushed by the brushes, two of said brushes being spiral and one plain, and means for rotating one of the brushes in one direction and the other two in the opposite direction.

10. A fruit cleaner including a conveyor and three rotary brushes extending approximately parallel therewith and in triangular relation, whereby a space is formed between the three brushes and the conveyor through which the articles to be brushed are conveyed by the conveyor and turned and brushed by the brushes, two of said brushes being spiral and one plain, and means for regulating the size of the space between the brushes.

11. In a fruit cleaner, the combination with a machine body and casing, of a plurality of rotary brushes within the casing, arranged in triangular relation and enclosing a space, a trough, and a conveyor belt extending the length of the trough and longitudinally through the space bounded by the brushes, whereby the articles fed into the trough are conveyed through the machine in contact with the several brushes.

12. In a fruit cleaner, the combination with a machine body and casing, of a plurality of rotary brushes within the casing, arranged in triangular relation and enclosing a space, a trough, and a conveyor belt extending the length of the trough and longitudinally through the space bounded by the brushes, whereby the articles fed into the trough are conveyed through the machine in contact with the several brushes, certain of said brushes being spiral, and means for turning the brushes in different directions in contact with the surface of the article to be brushed.

In testimony whereof I affix my signature.

JOHN A. REUTER.